April 7, 1970

J. NEUKIRCH 3,504,492

POWER-BRANCHING HYDRAULIC AXIAL PISTON TYPE TRANSMISSION

Filed April 26, 1968

INVENTOR:
Johannes Neukirch

BY:
Darby, Robertson & Vandenburgh
Attys.

April 7, 1970   J. NEUKIRCH   3,504,492
POWER-BRANCHING HYDRAULIC AXIAL PISTON TYPE TRANSMISSION
Filed April 26, 1968   6 Sheets-Sheet 4
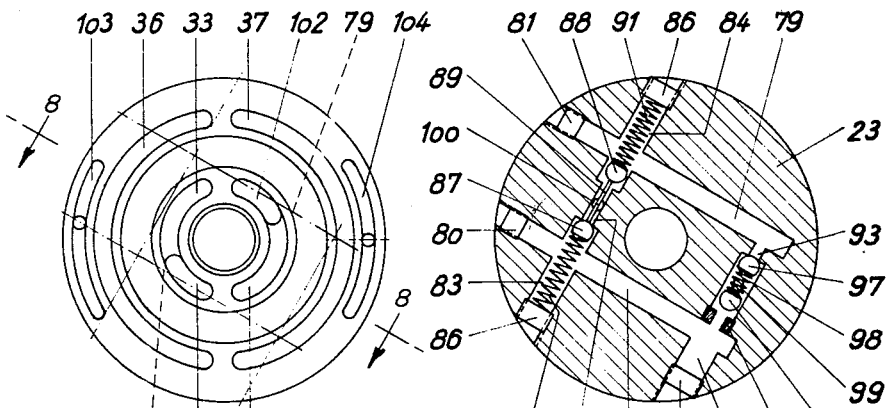
Fig. 10
Fig. 11
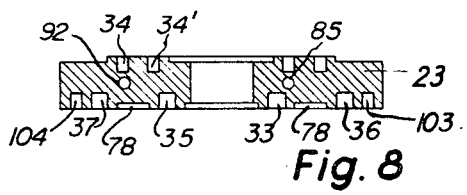
Fig. 8
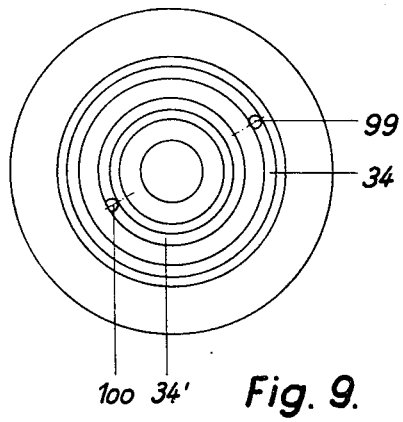
Fig. 9.
INVENTOR:
Johannes Neukirch
BY:
Darby, Robertson & Vandenburgh
Attys.

April 7, 1970    J. NEUKIRCH    3,504,492
POWER-BRANCHING HYDRAULIC AXIAL PISTON TYPE TRANSMISSION
Filed April 26, 1968    6 Sheets-Sheet 5
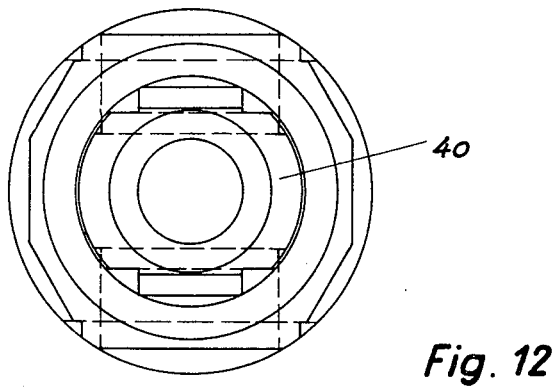
Fig. 12
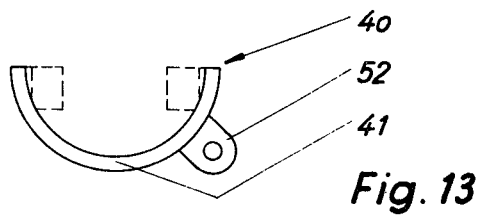
Fig. 13
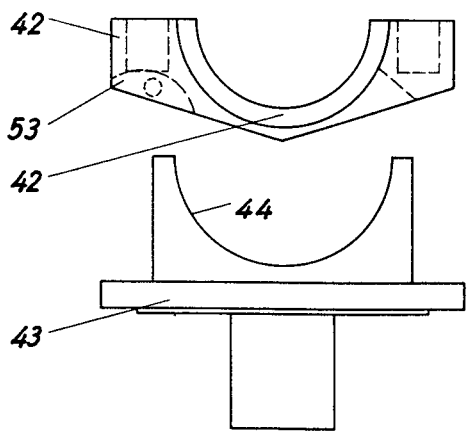
Fig. 14
Fig. 15
INVENTOR:
Johannes Neukirch
BY:
Darby, Robertson & Vandenburgh.
attys.

INVENTOR:
Johannes Neukirch

BY:
Darby, Robertson & Vandenburgh
attys.

United States Patent Office 3,504,492
Patented Apr. 7, 1970

3,504,492
POWER-BRANCHING HYDRAULIC AXIAL PISTON TYPE TRANSMISSION
Johannes Neukirch, Alter Durkheimer Weg, 6701 Ungstein, Germany
Filed Apr. 26, 1968, Ser. No. 724,411
Int. Cl. F16d *31/06;* F04b *1/12*
U.S. Cl. 60—53                                    10 Claims

ABSTRACT OF THE DISCLOSURE

A power-branching axial piston type transmission comprises a stationary cylinder block. A second cylinder block rotating with an input shaft is arranged coaxially in a central bore of the stationary cylinder block. Two swash plates forming an angle with each other are mounted on one common side of the cylinder blocks in a support body rotating with the driven shaft. On the other, input, side of the cylinder blocks there is a common disc shaped pressure distributor valve with a control valving surface having semicircular high pressure and low pressure grooves, the high pressure grooves and the low pressure grooves of both systems being connected with each other. The distributor valve is rotated with the support body through a driver member extending between the stationary and rotating cylinder blocks. The distributor valve is pressed to the cylinder blocks by a pressure member defining pressure chambers.

---

This invention relates to a power-branching hydraulic axial piston type transmission comprising: two axial piston systems, of which one operates as a pump and the other operates as a motor supplied with the oil delivered by the pump, a drive shaft, on one side, with which the cylinder block of a first axial piston system rotates, a cylinder block of the second axial piston system, stationary with respect to the casing, and a driven shaft aligned with the drive shaft on the other side of the transmission, the swash plates of both axial piston systems and a pressure distributor valve rotating with said driven shaft and the two cylinder blocks abutting said pressure distributor valves.

Conventional axial piston type transmissions comprise an axial piston system operating as a pump and having a fixed control surface on the distributor valve, a cylinder block abutting against the control surface and also a nonrotating swash plate. The axial pistons are supported on the swash plate, and when the swash plate is inclined with respect to the axis and the cylinder block rotates with a drive shaft, the pistons are reciprocated in the cylinders of the cylinder block. Through the control surface of the distributor valve the cylinders are connected alternatingly with a high pressure side and a low pressure side, whereby oil is pumped. The quantity of oil delivered depends on the inclination of the swash plate determining the piston stroke, and is variable with this inclination. The pumped oil is supplied to a second axial piston system operating as motor and also comprising a fixed control surface of the distributor valve, a cylinder block connected with the driven shaft and a non-rotating swash plate, which latter may also be adjustable. The high pressure side of the control surface of the distributor valve of the first system communicates with the high pressure side of the control surface of the second system and the low pressure side of the second system, in turn, communicates with the low pressure side of the first system. To compensate for leakage losses, a filling pump is provided, which pumps oil from the sump through check valves to the low pressure side of the transmission. The control surfaces are usually provided on two end faces of a disc shaped pressure distributor valve body, against which the end faces of the two cylinder blocks abut at opposite sides. The ratio of input and output speed is equal to the ratio of the stroke voluminae of motor and pump and can be varied by varying the inclinations of the swash plates. In such transmissions in which the swash plates do not rotate and, therefore, can be arranged simply in a rocker support pivotably mounted in the casing, the adjustment of the swash plates involves no serious problems. However, the total power is transmitted purely hydraulically, and the efficiency of hydraulic power transmission is relatively low.

For this reason, power branching transmissions of the type mentioned at the outset, have been designed. In such transmissions, a certain portion of the power is transmitted purely mechanically. If, for example, the swash plate of the motor system is perpendicular to the axis of rotation, the motor is not able to take up oil. In this case, in a power-branching system, drive shaft and driven shaft are rigidly coupled with each other. The power is transmitted 100 percent mechanically. With other positions of the swash plates, the power transmission is effected partly mechanically and partly hydraulically, i.e. through the displacement of oil quantities.

In such transmissions, the swash plates and the pressure distributor rotate with the drive shaft. One cylinder block is coupled with the drive shaft, the other one is held fixed to the casing. It will be apparent, that, in such power branching transmissions, the mounting and arrangement of the elements, their drive connections and the control and actuation during operation involve bigger design problems than those involved with non-power branching transmissions. In all prior art power branching transmissions substantially the same structural arrangement of the elements is retained as in the non-power branching transmissions. On both sides of a disc shaped pressure distributor, the end faces of the cylinder blocks abut the distributor. The drive or input shaft extends to one side, and the driven or output shaft extends to the other side.

In a prior art power branching transmission of this type (French Patent 1,133,469), the drive shaft extends centrally through the motor cylinder block and through the pressure distributor valve to the pump cylinder block splined to the drive shaft and structurally arranged on the output side of the transmission. The drive shaft, therein, extends through a hollow shaft fixed with respect to the casing. The motor cylinder block, structurally arranged on the input side of the pressure distributor valve, is held stationary with respect to the casing by said hollow shaft. The swash plates are pivotally mounted in a rotating intermediate casing connected to the driven or output shaft. Also the pressure distributor valve is mounted in said rotating intermediate casing. It will be apparent that such a rotating intermediate casing involves serious disadvantages. Thereby the transmission becomes bulky, as, of course, the intermediate casing must again be enclosed by a stationary casing. By means of a hollow shaft extending into the rotating intermediate casing, the motor cylinder block has to be held stationary. Furthermore, a complex mechanism is necessary for actuating, from the outside, the swash plates in the interior of this rotating intermediate casing during operation of the transmission.

For this reason, another construction has been devised (British Patent 1,009,572) wherein the driven shaft extends centrally through the whole transmission. The swash plates with hydraulic actuators and the pressure distributor valve are attached to the driven shaft and rotate therewith. The drive shaft is coupled with the pump cylinder block through a bellshaped body which extends over the swash plate of the pump system and its actuator. By a hollow cylinder extending over the swash plate of the motor system and its actuator, the cylinder block of the motor system is held stationary with respect to the casing.

Also here the problem arises of how to actuate and set during operation the rotating swash plates which are partly enclosed by elements (bellshaped body) rotating at a different speed. In the prior art construction, this is achieved by a particular design of the hydraulic actuators which are controlled by a control sleeve extending along the rotating driven or output shaft. This rotating control sleeve is axially shifted from outside through the stationary motor cylinder block.

It is true, this prior art construction avoids many disadvantages of the first mentioned transmission (of French Patent 1,133,469). The adjustment of the swash plates must, however, be effected by means of hydraulic actuators, which not only require considerable technical expenditure but also increase the over-all length of the transmission. Also the actuation and setting means for the control sleeve extending along the rotating driven or output shaft is relatively complex.

It is an object of this invention to provide a power branching hydraulic axial piston transmission, which is compact and simple in structure and which permits a convenient actuation of the swash plates during operation.

This is achieved in that the cylinder block rotating with the drive shaft is arranged in a central bore of the stationary cylinder block and coaxial therewith, and the two swash plates are mounted in a support member located on the output side of the transmission and rotating with the driven or output shaft. By the coaxial arrangement of the cylinder blocks, a compact construction is achieved. On the outside, there is the stationary cylinder block, and on the inside, there is the cylinder block rotating with the driven shaft. The drive or input shaft extends to one side and the two swash plates are located on the other side. Thus the transmission of the invention leaves the conventional set-up: swash plate, cylinder block, distributor valve, cylinder block, swash plate. Both swash plates which rotate with the output shaft are located on one side of the cylinder blocks. Thus there are no problems in getting access to the swash plates for the purpose of actuation and setting. It is not necessary, for this purpose, to get into rotating intermediate casings or bellshaped bodies.

The two swash plates can be made individually, i.e. independent of each other, adjustable. A particularly simple construction is, however, obtained, if the swash plates are supported in a common pivotable support member and form an angle with each other. Then only the single pivotable support member must be adjusted. Thereby the inclination angle of the motor swash plate with respect to the axis of rotation is increased and, at the same time, the inclination angle of the pump swash plate is decreased or vice versa.

The control valving surface for motor and pump may be provided on the pivotable support member (as known per se) and communicate with the cylinders through axial bores in the pistons. However, the pressure distributor valve may also contact the end faces on the input side of the two cylinder blocks, the drive shaft extending centrally therethrough.

In the latter case, the pressure distributor has to be coupled appropriately with the driven shaft. This may, for example, be done through a gearing.

Advantageously, however, the pressure distributor valve is connected with the support members for the swash plates through a driver member extending between the stationary outer cylinder block and the inner cylinder block rotating with the driven shaft. In contrast, for example, to the intermediate casing of French Patent 1,133,469 or the bellshaped body of British Patent 1,009,572, this rotating driver member does no harm, as nothing needs to be adjusted inside of this rotating driver member.

The pressure distributor valve may be provided with two concentric pairs of semicircular pressure distributor grooves in a first control valving surface in contact with the cylinder blocks, each groove of the inner pair communicating with the pump cylinders being connected with the diagonally opposite groove of the outer pair communicating with the motor cylinders. In this way, the center of the hydraulic pressure is located on the axis and torques are avoided which would tend to tilt the cylinder blocks relative to the control valving surface.

The disc shaped pressure distributor valve may have, on the side thereof away from the cylinder blocks, a second control valving surface with two concentric annular grooves, of which one communicates with the high pressure side and the other one communicates with the low pressure side of the said first control valving surface. A stationary but axially movable pressure member is held in abutment with the second control valving surface by two concentric pressure chambers. The chambers communicate through check valves with a filling pump and through bores with one of the said annular grooves each. Thus the oil pressure tending to raise the control valving surface from the cylinder block is counteracted. At the same time the problem is solved of conducting the filling oil from the stationary filling pump into the system rotating with the output shaft.

An embodiment of the invention is shown in the drawings and described hereinbelow.

FIG. 8 is an elevational sectional view of the pressure distributor valve of the embodiment shown in FIG. 7 and as seen at line 10—10 of FIG. 10.

FIG. 9 is a view of the pressure distributor valve as seen from the bottom in FIG. 8.

FIG. 10 is a view of the pressure distributor valve as seen from the top in FIG. 8.

FIG. 11 is a cross sectional view of the pressure distributor valve in the embodiment of the invention shown in FIG. 7.

FIG. 12 is a view of the swash plate arrangement as seen from the right in FIG. 7.

FIGS. 13 through 15 are elevational views of the individual elements of the swash plate arrangement of FIG. 12, and FIGS. 16 through 18 show different positions of the swash plates.

Figures 1, 2:
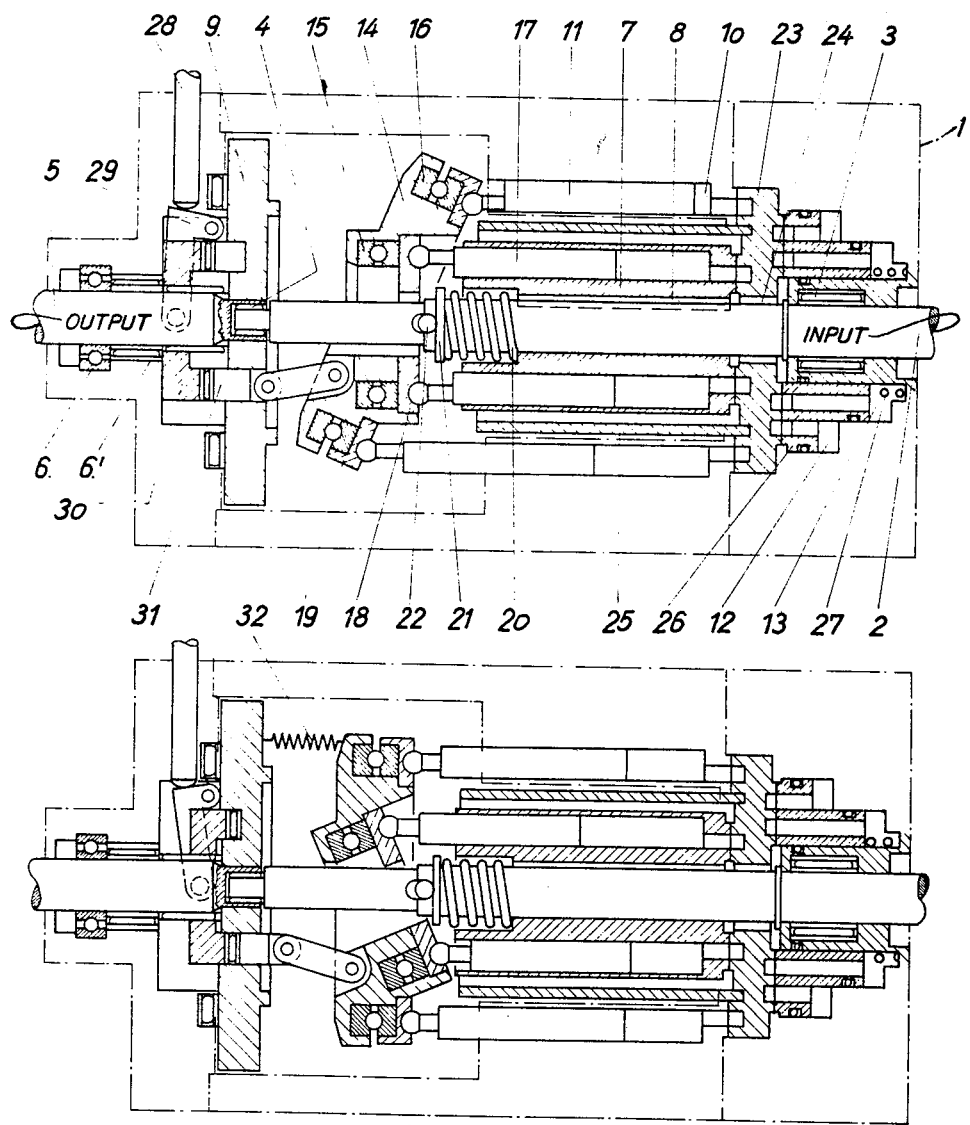
FIG. 1 is an elevational sectional view of a transmission designed in accordance with the invention, showing the transmission in starting position.
FIG. 2 is an elevational view of the transmission in maximum speed position.

In the embodiment of FIG. 1, a drive shaft 2 is mounted on one side of a casing 1 in bearings 3 and 4. On the other side of the casing, a driven shaft 5 is mounted in bearings 6 and 6'. A pump cylinder block 7 is rotated with the drive or input shaft 2 through a spline 8. A mounting body 9 is splined to the driven or output shaft 5. The casing has a circular array of axial bores 10 in which pistons 11 reciprocate. Thus it forms, at the same time, the cylinder block for the motor of the transmission. The pump cylinder block 7 is located coaxially with the motor cylinder block formed by the casing 1 in a central bore thereof. The casing has two filling oil connections through which filling oil is supplied to one of two pressure chambers 12 and 13 by a filling pump (not shown) through check valves (also not shown).

A pivotable support member 14 is adjustably mounted in (and rotates with) the mounting body 9. In the pivotable support member 14, there are two thrust bearings 15 and 16 carrying the swash plates 18 and 19 for pump and motor. The pistons 17 of the pump and the pistons 11 of the motor bear against said swash plates respectively. The two thrust bearings 15, 16 form an angle of 25° with each other.

Figure 3:
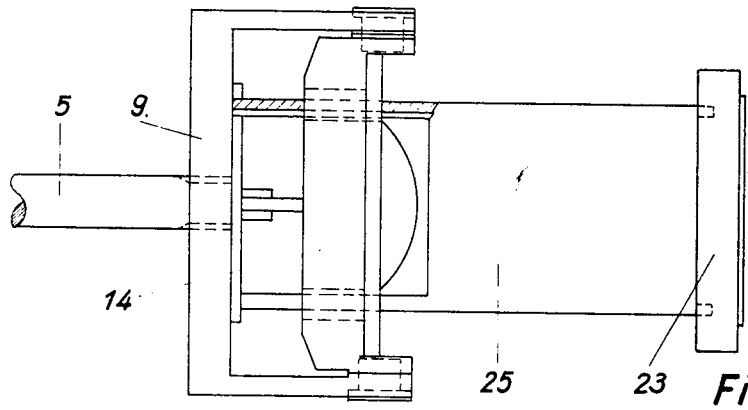
FIG. 3 shows the driven shaft with the transmission elements rotating therewith.
Figure 4:
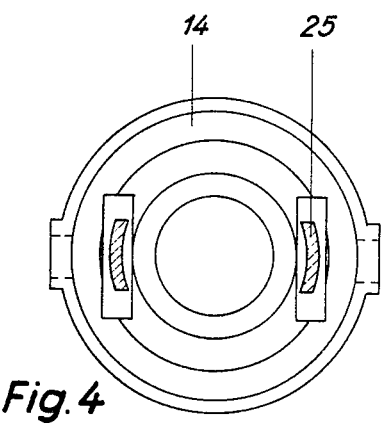
FIG. 4 shows the pivotable support member for the swash plates and the driver members extending therethrough.

A compression spring 20 surrounding the drive shaft 2 and bear against the pump cylinder block 7. It provides, on one hand, for the contact of the swash plate 18 on the thrust bearing 15 through a ring 21 and a pin 22 guided in a bearing block of the drive shaft, and, on the other hand, for the contact of the pump cylinder block 7 with a pressure distributor valve 23. The pressure distributor valve is mounted on the drive shaft through a needle bearing 24 and is connected with the mounting body 9 through a driver member 25. The driver member 25 is positioned between the stationary motor cylinder block (casing 1) and the rotating pump cylinder block 7. The connection of the driver member to the output shaft 5 is best illustrated in FIG. 3. A pressure member 26 bears against the rear side of the pressure distributor valve 23. The pressure member 26 is under the influence of the oil pressure in the pressure chambers 12, 13 and presses the pressure distributor valve 23 against the end faces of the cylinder blocks 1, 7. The pressure member 26, at the same time, provides fluid communication between the rotating pressure distributor valve 23 and the stationary filling pump. A spring 27 provides for the contact of the pressure member 26 with the pressure distributor valve during starting operation.

An adjustment screw 28 serves to move the pivotable support member 14. Screw 28 pivots a shank 29 pivotally mounted in casing 1. Through a thrust bearing, shank 29 lifts a thrust member 30 to move an actuating member 31 guided in mounting member 9, and rotating therewith. The actuating member 31 is linked to pivotable support member 14. A spring 32 produces a restoring force.

The device described operates as follows:

The first axial piston system with the cylinder block 7 and the swash plate 18 operates as pump and is driven by the drive shaft 2. The second axial piston system comprises the transmission casing with the bores 10, the pistons 11 and the swash plate 19. When the pivotable support member 14 is pivoted, from its starting position, (through the actuating members 28–31), the thrust bearing 15 leaves its perpendicular starting position (FIG. 1) and is moved to an inclined position. The pistons bearing against the swash plate 18 and the thrust bearing 15 now make a stroke and the pump delivers oil through the pressure distributor valve 23 to the oil motor. The pistons 11 of the oil motor bear against the swash plate 19 and the thrust bearing 16 in the same pivotable support member 14. In the starting position, the inclination of the swash plate 19 with respect to the axis and thus the piston stroke in the oil motor is at its maximum. When the pivotable support member 14 is pivoted away from this position, the piston stroke in the pump becomes larger while, because of the different inclination of the swash plate 18, the piston stroke in the motor becomes smaller. When the pivotable support member 14 has reached the position, in which the thrust bearing 16 and the swash plate 19 of the oil motor are perpendicular with respect to the axis so that the motor does not take up any oil (FIG. 2) the torque of the drive shaft 2 acts directly on the driven shaft 5. The efficiency of the hydrostatic coupling then obtained is practically one. The pivotable support member 14 mounted in mounting body 9, the driven shaft 5, to which the mounting body 9 is splined, and the pressure distributor valve 23 connected with the mounting body 9 through driver member 25 (FIG. 3) form a unit, on which the reaction forces of pump and motor produce a torque, the major portion of the drive power being directly mechanically transmitted from the drive shaft 2.

The pressure distributor valve 23 is so designed that the pump sucks the required oil from the suction or low pressure groove 33 (FIG. 5) of the pressure distributor valve 23. This low pressure groove 33 is again connected through passages with the low pressure annular groove of the pressure member 26 which communicates through pressure chamber 13 with the filling oil inlet. By the pump, the high presure oil is delivered from the high pressure groove 35 into the high pressure groove 36 of the pressure distributor valve and from there into the oil motor. The low pressure oil from the oil motor is returned to the low pressure groove 37 of the pressure distributor valve 23.

Figure 7:
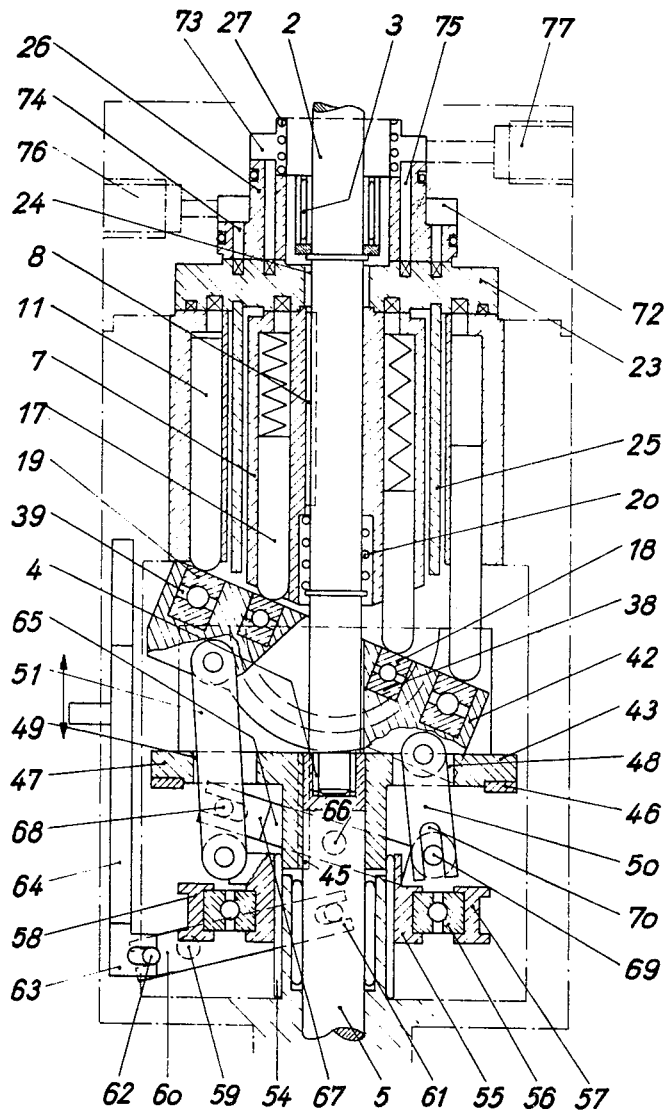
FIG. 7 is an elevational sectional view of a modified embodiment of a transmission in accordance with the invention.

A modified embodiment of the transmission is shown in FIG. 7 as an elevational sectional view similar to FIG. 1. Similar elements are designated by the same reference numerals as in FIG. 1. The embodiment of FIG. 7 differs from the embodiment of FIG. 1, at first, with respect to the actuating mechanism for the swash at plates 18 and 19. While in the embodiment of FIG 1 the two swash plates form an angle with each other, and are fixedly supported in a pivotable support member 14, which is pivotable as a whole with both swash plates, in the modified embodiment the swash plates are individually adjustable. The swash plates, in this embodiment, are formed of a race of one thrust bearing each, 38 and 39, respectively. The thrust bearing 38 is supported in a ring 40, which is mounted in semicylindrical hollow trunnions 41 in a second ring 42. The second ring supports the outer thrust bearing 39 and is pivoted with semicylindrical hollow trunnions in a mounting member 43 having a correspondingly cylindrical bearing surface 44. The mounting 43 (FIGS. 7 and 15) is splined at 45 to the driven (output) shaft 5 and is supported in axial direction in the casing by a thrust bearing 46.

In this way the swash plates 18 and 19 rotate with the driven shaft 5. They are pivoted in mounting member 43 individually about one common axis. The mounting body is provided with a radial flange 47. The flange 47 has openings 48 and 49 through which links 50 and 51, respectively, extend. The link 51 is pivoted on body 40, which has an eye 52 for this purpose. The link 50 is pivotably connected with the body 42 which has a recess 53, for this purpose, into which the link extends. An actuating member 55 is provided on an axially movable needle bearing coaxial with the drive shaft. Link 51 is pivoted on this actuating member. The actuating member 55 can be moved axially from outside through a ball bearing 56 and a ring 57. For this purpose, ring 57 is provided with an annular groove 58. A shank 60 pivoted in the casing at 59 extends from both the sides into annular groove 58 with blocks 61. The shank 59 has a pin on its end. The pin 62 is engaged by the bifurcated end 63 of a rod 64 mounted for axial movement in the casing. By shifting the rod 64 the shank 60 is pivoted, and thereby the ring 57 and the actuating member 55 are shifted in axial direction through block 61.

A two-armed lever 65 is pivoted at 66 on the mounting member 43. The two-armed lever, on one side thereof, with a bifurcated end extends around a pin 68 fixed on link 51. On its other end, the two-armed lever carries a pin 69. The link 50 has an elongated slot 70, which may be open towards the end of the link 50. With this slot 70, the link extends around the pin 69. A spring (not shown) acts on the body 42, and tends to pivot the body 42 clockwise.

Figure 16:
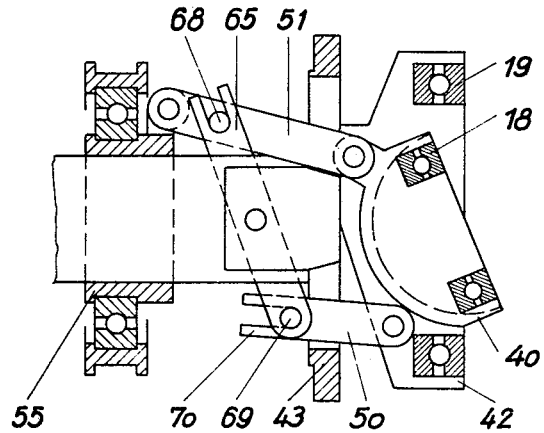
Figure 17:
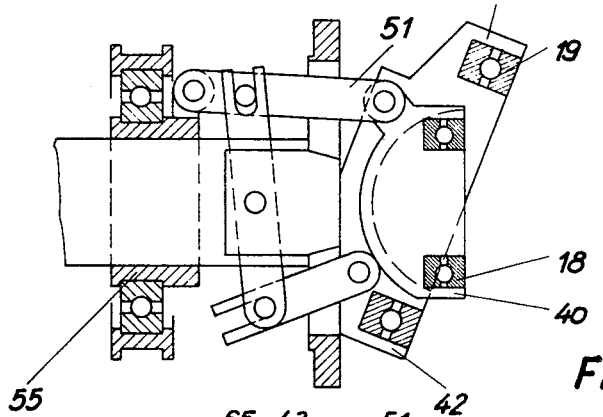
Figure 18:
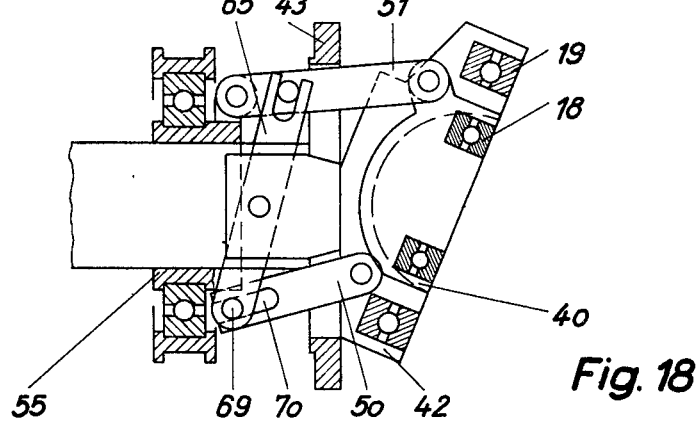

The operation of this actuating mechanism can best be seen from FIGS. 16 through 18. These figures show the pivotable support member with the actuating member in different positions. FIG. 16 shows the device in maximum speed position. In this position, the swash plate 19 of the motor is perpendicular with respect to the axis of rotation. The pistons 11 of the motor, therefore, make no stroke, and the motor is not able to take up oil. The swash plate 18 of the pump is pivoted counterclockwise away from the zero stroke position. Thus the pump tends to deliver oil which the motor, however, cannot take up. Consequently drive and driven shaft both rotate at the same speed. No oil delivery takes place but drive and driven shaft are rigidly coupled with each other through the oil. This position is achieved by moving the actuating member into its extreme left position. Through the link 51, the body 40 with the swash plate 18 are pivoted thereby counterclockwise into the position shown. Through the pin 68 the two-armed lever 65 is pivoted counterclockwise. Its lower end is moved thereby to the right in FIG. 16, whereby it moves the link 50 to the right through pin 69. Thereby, also pivotable support member 42 with the swash plate is pivoted counterclockwise into the position indicated. The link 50, under the action of the spring acting on member 42, engages pin 49 with the righthand end of the oblong slot 70.

When the actuating member 55 is pivoted away from this end postion into the position shown in FIG. 17, the link 51 is moved towards the right and the body 40 is pivoted clockwise. In the position shown in FIG. 17, the swash plate 18 of the pump is perpendicular to the axis. Thus the pump does not deliver oil. The motor swash plate 19 is inclined. If the driven (output) shaft were to rotate, the motor has to take up oil which it cannot now do. Consequently the output speed, in this state, must be zero.

If the actuating member 55, as shown in FIG. 18, is moved still further to the right, the element 40 with the swash plate 18 is further rotated clockwise. The element 42 engages the mounting member 43 and therefore cannot be rotated further. The pin 69 at the end of the two-armed lever 65 is lifted from the end of slot 70 in link 50, and is moved along said slot 70. As the swash plate 18 has now been rotated clockwise beyond the zero stroke position, high pressure side and low pressure side of the pump are exchanged. The swash plate 19 of the motor remains in its previous position. By the exchange of the high pressure side and the low pressure side of the motor, the direction of rotation of the driven shaft is reversed.

Thus the transmission described permits a variation of the transmission ratio from direct drive through idling to reverse drive.

FIGS. 8 through 11 show the design of the pressure distributor valve 23 particularly well suited for a transmission in accordance with FIG. 7.

Figure 5:
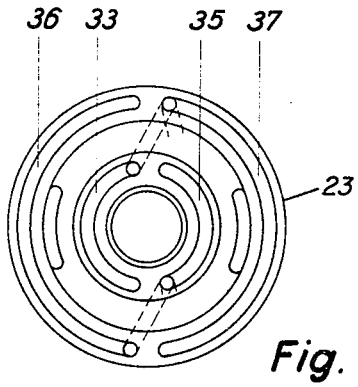
FIG. 5 shows the pressure distributor valve as seen from the left in FIG. 1.
Figure 6:
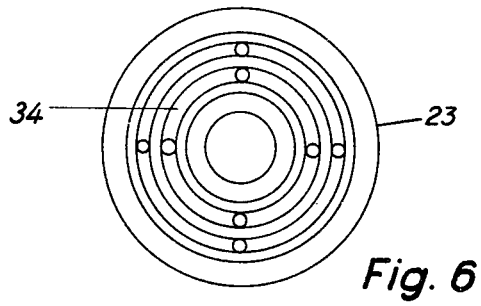
FIG. 6 shows the pressure distributor valve as seen from the right in FIG. 1.

Similar to the embodiment of FIGS. 5 and 6, the pressure distributor valve 23 has two pairs of semicircular grooves 33, 35 and 36, 37 symmetrically arranged with respect to each other in the control valving surface facing the cylinder block, one groove of each pair communicating with the opposite groove of the other pair through passages. On the rear side of the pressure distributor valve 23, there are two concentric annular grooves 34, 34'. The pressure distributor valve 23 is pressed against the end face of the cylinder blocks by a pressure member 26. The pressure member has a shoulder, as in FIG. 1, so that two pressure chambers 72 and 73 are formed. The pressure member has corresponding annular grooves which communicate with one of the pressure chambers 72 or 73 through passages 74 and 75, respectively. The annular chamber 72 is connected to an outlet 76. This outlet may either be sealed or provided with a safety valve. The annular chamber 73 communicates with an inlet. This inlet communicates with an oil sump. Provision is made by means of a passage and valve arrangement in the pressure distributor valve 23 that the annular chamber 73 is always connected to the low pressure side of the pump through the annular groove 34'. This passage and valve arrangement can best be seen from FIG. 11.

The pressure distributor valve 23 contains two transverse bores 78 and 79. These bores are parallel blind holes and closed by plugs 80 and 81, respectively. In the plane of the two transverse bores 78 and 79, two bores 83 and 84 extend in alignment with each other and from opposite sides. These latter two bores are connected by a narrow passage 85, valve seats are formed at the junctions of the bores 83 and 84 with the narrow connection passage 85. The two bores 83 and 84 are closed by plugs 86. Two valve balls 87 and 88 are connected with each other by a thin rod extending through the connection passage 85. The valve balls are under the influence of compression springs 90 and 91, respectively. An additional bore 92 extends in parallel to the bore 83, crosses the bore 78 and communicates with the bore 79 through a narrow passage 93. The bore 92 is closed by a plug 94. A throttle member 95 forming a valve seat is screwed into said bore 92 to beyond the passage 78. A further valve seat is formed at the junction of the bore 92 and the narrow connection passage 93. Two valve balls 96 and 97 under the action of a spring 98 cooperate with the valve seats, the spring tending to press the balls on the valve seats. A passage 99 opens between the valve balls. The other end of passage 99 opens into the annular groove 34 in the second control valving surface of the pressure distributor valve 23.

In similar manner, a passage 100 opens in the connection passage 85 and, at the other end, communicates with the annular groove 34' of the second control valving surface of the pressure distributor valve 23. As can best be seen from FIG. 10, the groove 33 of the first control valving surface communicates with the bore 78 through a passage 101. In similar manner, the groove 35 communicates with the bore 79 through a passage 102.

The arrangement described operates as follows:

With one mode of operation the groove 33 of the first control valving surface of the pressure distributor valve 23 is the high pressure groove, the groove 35 being the low pressure groove. Accordingly, a high pressure is produced in bore 78 and a low pressure in bore 79. The valve ball 87 is pressed on its seat, while, at the same time, the valve ball 88 is lifted from its seat. Thereby, the low pressure groove 35 is in connection with the annular groove 34' through passage 100 and with the annular chamber 73 and the inlet 77 leading to the oil sump, through the passage 75. At the same time the high pressure lifts the valve ball 96 from its seat, the valve ball 97 being pressed on its seat. A communication is established thereby from the high pressure groove 35 to the annular groove 34 and through passage 74 to the annular chamber 72. When the swash plate 18 of the pump is rotated into another position in which the high pressure side and the low pressure side are interchanged, the valve ball 88 is pressed on its seat, while the valve ball 87 is lifted. At the same time, the valve ball 97 is lifted from its seat and the valve ball 96 is pressed on its seat. Consequently also in this position, the annular groove 34 is connected with the high pressure side and the annular groove 34' is connected with the low pressure side of the pump. With this arrangement, a separate filling pump need not be used.

In addition, there are in the pressure distributor valve 23 the connections shown in FIG. 5 between the various grooves of the first control valving surface, which have not been shown in FIG. 10 for clarity. As can be seen from FIG. 10, additional pressure areas 103 and 104 are provided in the first control valving surface and communicate with the bore 78 and the bore 79, respectively. These pressure areas prevent the occurrence of tilting torques on the control valving surface, as the pressure centers of high pressure and low pressure grooves coincide.

What I claim is:

1. A power-branching hydraulic axial piston transmission comprising two axial piston systems of which one operates as pump and the other one as motor, the said motor being operated by the oil delivered by said pump, a drive shaft on one side with which a cylinder block of a first axial piston system rotates, a stationary cylinder block of the second axial piston system, and a driven shaft in alignment with said drive shaft on the other side of the transmission, the swash plates of the two axial piston systems and a pressure distributor valve rotating with said driven shaft and the two cylinder blocks abutting said pressure distributor valve characterized in that the cylinder block rotating with the drive shaft is arranged coaxial with the stationary cylinder block in a central bore thereof, and that the two swash plates are supported in a mounting member located on the output side of the transmission and rotating with the driven shaft.

2. A transmission as claimed in claim 1, wherein the swash plates are supported in a common pivotable support member and form an angle with each other.

3. A transmission as claimed in claim 1, wherein the pressure distributor valve abuts and end faces of the cylinder blocks on the input side of the transmission, and the drive shaft extends centrally through said valve.

4. A transmission as claimed in claim 3, wherein the pressure distributor valve is connected with the mounting member through a driver member extending between the stationary outer cylinder block and the inner cylinder block rotating with the drive shaft.

5. A transmission as claimed in claim 3, wherein the pressure distributor valve is provided with two concentric pairs of semicircular pressure distributor grooves in a first control valving surface in contact with the cylinder blocks, and wherein each groove of the inner pair communicating with the pump cylinders is connected with the diagonally opposite groove of the outer pair communicating with the motor cylinders.

6. A transmission as claimed in claim 5, wherein the disc shaped pressure distributor valve is provided with a second control valving surface with two concentric annular grooves on the side away from the cylinder blocks, one of said annular grooves communicating with the high pressure side and the other one with the low pressure side of the said first control valving surface, and wherein a stationary but axially movable pressure member is held in contact with the second control valving surface by two concentric pressure chambers, which are connected to a filling pump through check valves and through bores with one of the said annular grooves each.

7. A transmission as claimed in claim 1.

wherein two annular swash plates for pump and motor are mounted one within the other for individual pivotal movement in the mounting member rotating with the driven shaft, the inner pump swash plate being pivoted with trunnions in the trunnions of the motor swash plate, which are in turn pivotably mounted in the mounting member, wherein the pump swash plate is connected by a link with an actuating member rotating with the driven shaft and axially movable thereon, and can be rotated by said link beyond the zero stroke position, wherein the motor swash plate is adjustable by the actuating member through an actuating mechanism engaging the swash plate non-positively, the planes of the two swash plates forming an angle with each other, and wherein the motor swash plate engages a stop prior to or at the zero stroke position.

8. A transmission as claimed in claim 7, wherein the actuating mechanism comprises a two-armed lever pivoted on the mounting member, said lever extending, on one side, with a bifurcated end around a pin, which is provided on the link between actuating member and pump swash plate, and, on the other end, carries a pin itself, and wherein a link pivoted on the motor swash plate extends around the latter pin with an oblong slot and is held in engagement with the pin by a spring acting on the motor swash plate, the link being lifted out of engagement with the pin when the motor swash plate gets to a stop.

9. A transmission as claimed in claim 5, wherein the pressure distributor valve is disc shaped and is provided with a second control valving surface on its side away from the cylinder blocks, said second control valving surface having two concentric annular grooves, which communicate with one side each of the said first control valving surface, wherein one of the annular grooves communicates with an oil sump and wherein the pressure distributor valve contains check valves through which the annular groove communicating with the oil sump is always connected to the low pressure side of the pump.

10. In a power-branching, axial piston transmission comprising a fixed casing with a drive shaft and a driven shaft mounted therein for rotation about a common axis, the driven shaft extending from one end of said casing and the drive shaft extending from the other end of said casing, two axial piston systems in said housing, one of which systems operates as a pump and the other of which acts as a motor, said motor being operated by the oil delivered by said pump, each of said systems including a cylinder block and a swash plate coaxial with said axis, one of said cylinder blocks being stationary and the other being rotatable, one of said shafts being connected to the rotatable cylinder blocks for rotation therewith, and the other of said shafts being connected to the swash plates for rotation therewith, the improvement comprising:

said stationary cylinder block having a cylindrical cavity therein coaxial with said axis, said rotating cylinder block being positioned in said cavity, a mounting member located adjacent the end of the casing from which said other shaft extends, said mounting member being connected to said other shaft for rotation therewith, said swash plates being supported on said mounting member, said systems including a rotatable pressure distributor valve common to said two systems, said valve abutting said cylinder blocks and being positioned adjacent the end of the casing from which said one shaft extends, and driving means connecting the swash plates and said mounting member, said driving means extending through said cavity between the stationary cylinder block and the rotating cylinder block.

References Cited

UNITED STATES PATENTS

| 1,297,734 | 3/1919 | Rayburn et al. | 60—53 |
| 1,840,864 | 1/1932 | Rayburn et al. | 60—53 |
| 1,840,865 | 1/1932 | Rayburn et al. | 60—53 |
| 3,364,679 | 1/1968 | Osojnak | 60—53 |
| 3,364,680 | 1/1968 | Osojnak | 60—53 |

EDGAR W. GEOGHEGAN, Primary Examiner

U.S. Cl. X.R.

103—162

UNITED STATES PATENT OFFICE
CERTIFICATE OF CORRECTION

Patent No. 3,504,492　　　　　　　　　　Dated April 7, 1970

Inventor(s) JOHANNES NEUKIRCH

It is certified that error appears in the above-identified patent and that said Letters Patent are hereby corrected as shown below:

Column 2, Line 49, "pivotally" should read --pivotably--;
Column 3, Line 64, "members" should read --member--;
Column 4, Line 15, "The" should read --These--;
Column 5, Line 8, "bear" should read --bears--;
Column 6, Line 18, "at" after "swash" should be deleted.
Column 6, Line 31, "member" should be inserted after "mounting";
Column 6, Line 50, "the" after "both" should be deleted;
Column 6, Line 58, the period after "thereof" should be a comma;
Column 7, Line 18, "postion" should read --position--;
Column 9, Line 19, "and" should read --the--;
Column 9, Line 49, the period after "1" should be a comma;

SIGNED AND
SEALED

OCT. 6, 1970

(SEAL)
Attest:

Edward M. Fletcher, Jr.
Attesting Officer

WILLIAM E. SCHUYLER, JR.
Commissioner of Patents